United States Patent
Yu et al.

(10) Patent No.: US 11,173,927 B2
(45) Date of Patent: Nov. 16, 2021

(54) METHOD, APPARATUS, COMPUTER DEVICE AND STORAGE MEDIUM FOR AUTONOMOUS DRIVING DETERMINATION

(71) Applicant: BEIJING BAIDU NETCOM SCIENCE AND TECHNOLOGY CO., LTD., Beijing (CN)

(72) Inventors: Ning Yu, Beijing (CN); Chengfa Wang, Beijing (CN); Fan Yang, Beijing (CN); Leibing Lv, Beijing (CN); Junping Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 103 days.

(21) Appl. No.: 16/709,765

(22) Filed: Dec. 10, 2019

(65) Prior Publication Data

US 2020/0180659 A1  Jun. 11, 2020

(30) Foreign Application Priority Data

Dec. 10, 2018 (CN) .......................... 201811505392.1

(51) Int. Cl.
  *B60W 60/00* (2020.01)
  *G05D 1/00* (2006.01)
  *B60W 50/14* (2020.01)

(52) U.S. Cl.
  CPC ........ *B60W 60/0053* (2020.02); *B60W 50/14* (2013.01); *B60W 60/001* (2020.02);
  (Continued)

(58) Field of Classification Search
  CPC ............. B60W 60/0053; B60W 50/14; B60W 60/001; B60W 2555/20;
  (Continued)

(56) References Cited

U.S. PATENT DOCUMENTS 9,150,224 B2 * 10/2015 Yopp ..................... B60W 50/10
9,317,033 B2 *  4/2016 Ibanez-Guzman ..........................
                                                        B60W 60/0025
(Continued)

FOREIGN PATENT DOCUMENTS

CN   107097780 A   8/2017
CN   107207013 A   9/2017
(Continued)

OTHER PUBLICATIONS

Search Report for Chinese application No. 201811505392.1, dated Aug. 9, 2019 with English translation provided by Google Translate.
(Continued)

*Primary Examiner* — Peter D Nolan
*Assistant Examiner* — Peter Y Ning
(74) *Attorney, Agent, or Firm* — Ladas & Parry, LLP (57) ABSTRACT

A method, an apparatus, a computer device and a storage medium for autonomous driving determination are proposed. The method includes: obtaining information about a driving scenario of an autonomous vehicle when a preset trigger condition is met; comparing the information about the driving scenario with an autonomous driving capability of the autonomous vehicle; determining, according to a comparison result, whether the autonomous vehicle is adapted to employ an autonomous driving mode in the driving scenario. The technical solution of the present disclosure may be applied to improve the safety of the vehicle and the user.

20 Claims, 4 Drawing Sheets (52) U.S. Cl.
CPC ......... *G05D 1/0061* (2013.01); *G05D 1/0088* (2013.01); *B60W 2555/20* (2020.02)

(58) Field of Classification Search
CPC . B60W 2050/0074; B60W 2050/0072; B60W 2050/007; B60W 2552/05; B60W 2555/60; B60W 60/0059; B60W 60/0051; G05D 1/0088; G05D 1/0061
See application file for complete search history.

(56) References Cited

U.S. PATENT DOCUMENTS

| | | | | |
|---|---|---|---|---|
| 9,342,074 | B2* | 5/2016 | Dolgov | G05D 1/0061 |
| 10,732,627 | B1* | 8/2020 | Roberson | B60W 50/0098 |
| 2014/0156134 | A1* | 6/2014 | Cullinane | B60W 50/082 701/23 |
| 2014/0330478 | A1 | 11/2014 | Cullinane et al. | |
| 2016/0355192 | A1* | 12/2016 | James | B60R 11/04 |
| 2016/0375912 | A1* | 12/2016 | Christensen | B60W 30/143 701/25 |
| 2017/0102700 | A1* | 4/2017 | Kozak | G05D 1/0061 |
| 2017/0368936 | A1* | 12/2017 | Kojima | B60W 40/09 |
| 2018/0141568 | A1* | 5/2018 | Singhal | A61B 5/01 |
| 2020/0017124 | A1* | 1/2020 | Camhi | G06N 20/00 |

FOREIGN PATENT DOCUMENTS

| | | |
|---|---|---|
| CN | 107499311 A | 12/2017 |
| CN | 107564363 A | 1/2018 |
| CN | 107650911 A | 2/2018 |
| CN | 108508881 A | 9/2018 |

OTHER PUBLICATIONS

First Office Action issued in Chinese application No. 201811505392.1, dated Aug. 19, 2019 with English translation provided by Google Translate.

Second Office Action issued in Chinese application No. 201811505392.1, dated Nov. 14, 2019 with English translation provided by Google Translate.

* cited by examiner

METHOD, APPARATUS, COMPUTER DEVICE AND STORAGE MEDIUM FOR AUTONOMOUS DRIVING DETERMINATION

CROSS REFERENCE TO RELATED APPLICATIONS

The present application claims the priority of Chinese Patent Application No. 201811505392.1, filed on Dec. 10, 2018, with the title of "Method, apparatus, computer device and storage medium for autonomous driving determination". The disclosure of the above application is incorporated herein by reference in its entirety.

FIELD

The present disclosure relates to computer application technologies, and particularly to a method, an apparatus, a computer device and a storage medium for autonomous driving determination.

BACKGROUND

At present, development of autonomous vehicles is still in a relatively primary stage, and autonomous vehicles have a limited capability and may only drive autonomously in a specific scenario.

Then, after the autonomous vehicle is delivered to a user, if the user is unaware of a capability range of the autonomous vehicle and activates an autonomous driving mode (autonomous driving function) in a scenario beyond a range of the capability of the autonomous vehicle without permission, an accident may occur and thereby affects safety of the vehicle and the user.

SUMMARY

In view of the above, the present disclosure provides a method, an apparatus, a computer device and a storage medium for autonomous driving determination.

Specific technical solutions are as follows:

According to an embodiment of the present disclosure, a method for autonomous driving determination is proposed, the method include:

obtaining information about a driving scenario of an autonomous vehicle when a preset trigger condition is met;

comparing the information about the driving scenario with an autonomous driving capability of the autonomous vehicle; and determining, according to a comparison result, whether the autonomous vehicle is adapted to employ an autonomous driving mode in the driving scenario.

According to an embodiment of the present disclosure, the preset trigger condition is met when a request to activate the autonomous driving mode is received.

According to an embodiment of the present disclosure, the method may further include:

activating the autonomous driving mode in response to determining according to the comparison result that the autonomous vehicle is adapted to employ the autonomous driving mode in the driving scenario;

prohibiting activation of the autonomous driving mode, or reminding an occupant on the autonomous vehicle that the autonomous vehicle is not adapted to activate the autonomous driving mode in response to determining according to the comparison result that the autonomous vehicle is not adapted to employ the autonomous driving mode in the driving scenario.

According to an embodiment of the present disclosure, the preset trigger condition is met each time a period of a predetermined time duration passes while the autonomous vehicle is in the autonomous driving mode.

According to an embodiment of the present disclosure, the method may further include:

continuing to employ the autonomous driving mode in response to determining according to the comparison result that the autonomous vehicle is adapted to employ the autonomous driving mode in the driving scenario;

reminding an occupant on the autonomous vehicle to switch to a manual driving mode in response to determining according to the comparison result that the autonomous vehicle is not adapted to employ the autonomous driving mode in the driving scenario.

According to an embodiment of the present disclosure, the comparing the information about the driving scenario with an autonomous driving capability of the autonomous vehicle may include: comparing to find whether the information about the driving scenario includes content beyond a range of the autonomous driving capability; and the determining, according to a comparison result, whether the autonomous vehicle is adapted to employ an autonomous driving mode in the driving scenario may include:

determining that the autonomous vehicle is not adapted to employ the autonomous driving mode in the driving scenario if the information about the driving scenario includes content beyond the range of the autonomous driving capability; and determining that the autonomous vehicle is adapted to employ the autonomous driving mode in the driving scenario if the information about the driving scenario does not include content beyond the range of the autonomous driving capability.

According to an embodiment of the present disclosure, an apparatus for autonomous driving determination is proposed, the apparatus include:

an obtaining unit for obtaining information about a driving scenario of an autonomous vehicle when a preset trigger condition is met;

a determination unit for comparing the information about the driving scenario with an autonomous driving capability of the autonomous vehicle, and determining, according to a comparison result, whether the autonomous vehicle is adapted to employ an autonomous driving mode in the driving scenario.

According to an embodiment of the present disclosure, the preset trigger condition is met when a request to activate the autonomous driving mode is received.

According to an embodiment of the present disclosure, the apparatus may further include: an executing unit for activating the autonomous driving mode in response to determining according to the comparison result that the autonomous vehicle is adapted to employ the autonomous driving mode in the driving scenario; and prohibiting activation of the autonomous driving mode, or reminding an occupant on the autonomous vehicle that the autonomous vehicle is not adapted to activate the autonomous driving mode in response to determining according to the comparison result that the autonomous vehicle is not adapted to employ the autonomous driving mode in the driving scenario.

According to an embodiment of the present disclosure, the preset trigger condition is met each time a period of a predetermined time duration passes while the autonomous vehicle is in the autonomous driving mode.

According to an embodiment of the present disclosure, the apparatus may further include: an executing unit for continuing to employ the autonomous driving mode in response to determining according to the comparison result that the autonomous vehicle is adapted to employ the autonomous driving mode in the driving scenario, and reminding the occupant on the autonomous vehicle to switch to a manual driving mode in response to determining according to the comparison result that the autonomous vehicle is not adapted to employ the autonomous driving mode in the driving scenario.

According to an embodiment of the present disclosure, the determination unit compares to find whether the information about the driving scenario includes content beyond a range of autonomous driving capability, determines that the autonomous vehicle is not adapted to employ the autonomous driving mode in the driving scenario if the information about the driving scenario includes content beyond the range of the autonomous driving capability, and determines that the autonomous vehicle is adapted to employ the autonomous driving mode in the driving scenario if the information about the driving scenario does not include content beyond the range of the autonomous driving capability.

According to an embodiment of the present disclosure, it is proposed a computer device, which includes a memory, a processor and a computer program which is stored on the memory and runs on the processor, the processor, upon executing the program, implementing the above-mentioned method.

According to an embodiment of the present disclosure, it is proposed a computer-readable storage medium on which a computer program is stored, the program, when executed by the processor, implementing the aforesaid method.

As may be seen from the above introduction, according to the solutions of the present disclosure, it is possible to compare the information about the driving scenario with an autonomous driving capability of the autonomous vehicle, determine, according to a comparison result, whether the autonomous vehicle is adapted to employ an autonomous driving mode in the driving scenario, and then take a corresponding processing measure according to a determination result, to avoid the existing problem and improve safety of the vehicle and the user.

DETAILED DESCRIPTION OF EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

In addition, it should be appreciated that the term "and/or" used in the text is only an association relationship depicting associated objects and indicates that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
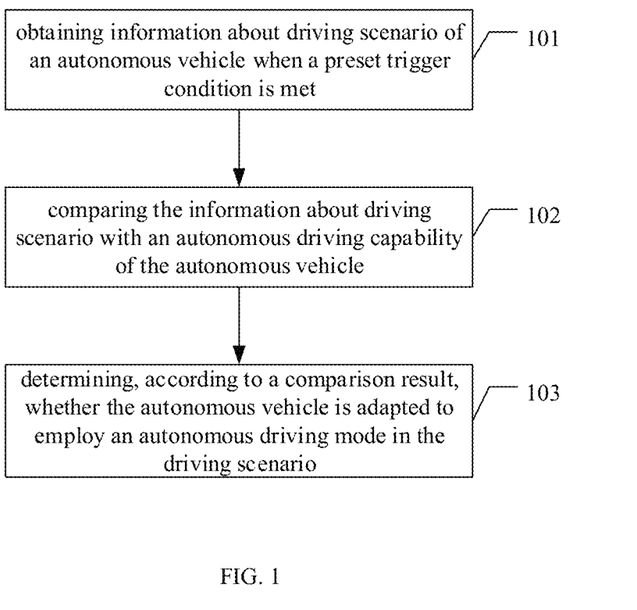
FIG. 1 is a flow chart of a method for autonomous driving determination according to a first embodiment of the present disclosure.

FIG. 1 is a flow chart of a method for autonomous driving determination according to a first embodiment of the present disclosure. As shown in FIG. 1, the method includes the following processes.

At 101, obtaining information about a driving scenario of an autonomous vehicle when a preset trigger condition is met.

At 102, comparing the information about a driving scenario with an autonomous driving capability of the autonomous vehicle.

At 103, determining, according to a comparison result, whether the autonomous vehicle is adapted to employ an autonomous driving mode in the driving scenario.

Specifically, when the preset trigger condition is met, a matching degree between the autonomous driving capability of the autonomous vehicle and the current driving scenario may be checked.

The method described in this embodiment may be applied to various different scenarios, including but not limited to those shown in the following embodiments.

Figure 2:
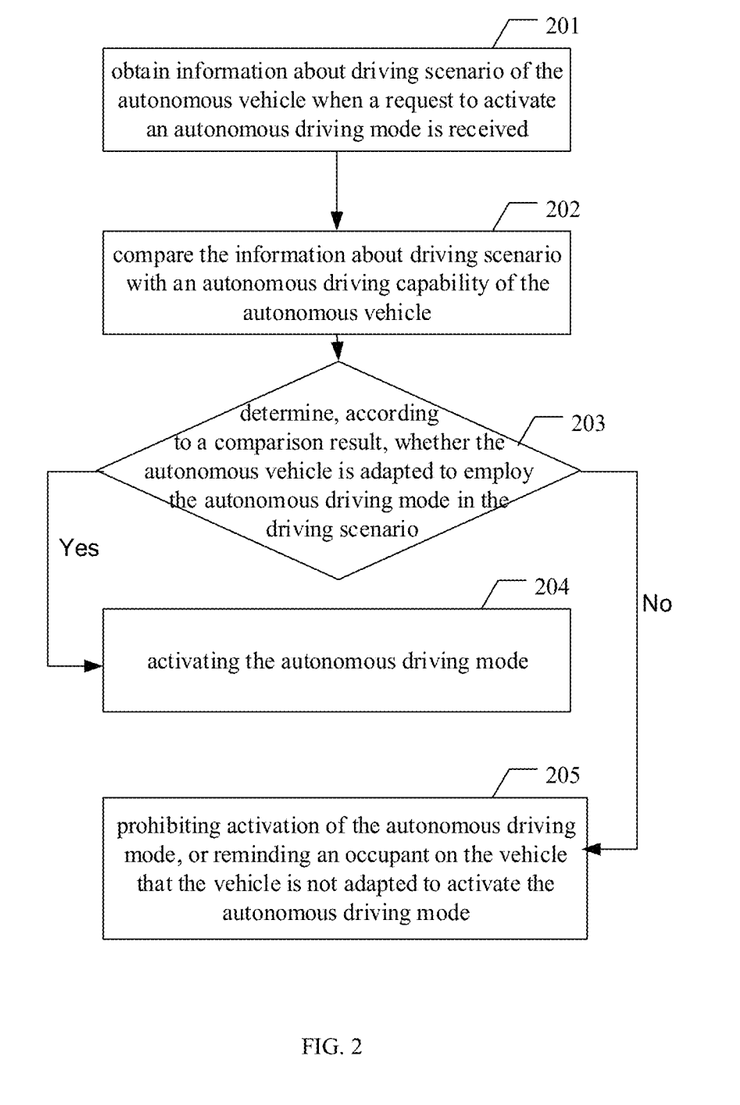
FIG. 2 is a flow chart of a method for autonomous driving determination according to a second embodiment of the present disclosure.

FIG. 2 is a flow chart of a method for autonomous driving determination according to a second embodiment of the present disclosure. As shown in FIG. 2, the method includes the following processes.

At 201, obtaining information about a driving scenario of the autonomous vehicle when a request to activate an autonomous driving mode is received.

Receiving a request to activate an autonomous driving mode may refer to receiving a request to switch from a manual driving mode to the autonomous driving mode, or receiving a request to directly activate the autonomous driving mode.

If the request to activate the autonomous driving mode is received, the current information about the driving scenario of the autonomous vehicle may be obtained.

The information about the driving scenario may include a location of the vehicle (such as latitude and longitude), weather, road conditions (such as a road type), traffic facilities (such as traffic lights), and the like. The information about the driving scenario may be obtained by a sensor, camera and the like deployed on the autonomous vehicle. For example, the location of the vehicle may be obtained based on a positioning sensor, the weather may be obtained based on a humidity sensor, and the road conditions and traffic facilities may be obtained based on a camera, a millimeter wave radar and a laser radar.

At 202, comparing the information about the driving scenario with the autonomous driving capability of the autonomous vehicle.

For example, comparison may be performed to find whether the information about the driving scenario includes content beyond a pre-stored range of autonomous driving capability.

At 203, determining, according to a comparison result, whether the autonomous vehicle is adapted to employ the autonomous driving mode in the driving scenario, if yes, performing 204, otherwise, performing 205.

If the information about the driving scenario includes content beyond the range of the autonomous driving capability, it may be determined that the autonomous vehicle is not adapted to employ the autonomous driving mode in the driving scenario.

If the information about the driving scenario does not include content beyond the range of the autonomous driving capability, it may be determined that the autonomous vehicle is adapted to employ the autonomous driving mode in the driving scenario.

The autonomous driving capability may be presented in a list or the like, which may include the type of a road on which the vehicle is allowed to travel, whether to allow driving in rainy or snowy weather, whether to allow driving on a road with traffic lights, a range of areas in which the vehicle is allowed to travel, and so on. The type of a road on which the vehicle is allowed to travel may refer to an urban road, a rural road or the like, and the range of areas in which the vehicle is allowed to travel may mean that the vehicle is allowed to travel only in certain specific areas or cities.

Assuming that the location of the vehicle in the obtained information about the driving scenario belongs to the city of Tangshan, whereas the city in which the vehicle is allowed by the autonomous driving capability to drive is Beijing, it may be believed that the information about the driving scenario includes content beyond the range of the autonomous driving capability, so that it is determined that the autonomous vehicle is not adapted to employ the autonomous driving mode in the driving scenario.

Assuming that the weather in the obtained information about the driving scenario is a rainy day, whereas the autonomous driving capability does not permit the vehicle to travel in rainy or snowy weather, it may be believed that the information about the driving scenario includes content beyond the range of the autonomous driving capability, so that it is determined that the autonomous vehicle is not adapted to employ the autonomous driving mode in the driving scenario.

Assuming that the road condition in the obtained information about the driving scenario is a rural road, whereas the type of a road on which the vehicle is allowed by the autonomous driving capability is an urban road, it may be believed that the information about the driving scenario includes content beyond the range of the autonomous driving capability, so that it is determined that the autonomous vehicle is not adapted to employ the autonomous driving mode in the driving scenario.

Assuming that the obtained information about the driving scenario shows that there are traffic lights on the road, whereas the autonomous driving capability does not permit the vehicle to travel on a road with the traffic lights, it may be believed that the information about the driving scenario includes content beyond the range of the autonomous driving capability, so that it is determined that the autonomous vehicle is not adapted to employ the autonomous driving mode in the driving scenario.

At 204, activating the autonomous driving mode.

If it is determined according to the comparison result that the autonomous vehicle is adapted to employ the autonomous driving mode in the driving scenario, the autonomous driving mode may be activated.

At 205, prohibiting activation of the autonomous driving mode, or reminding an occupant on the vehicle that the vehicle is not adapted to activate the autonomous driving mode.

If it is determined according to the comparison result that the autonomous vehicle is not adapted to employ the autonomous driving mode in the driving scenario, it is possible to directly prohibit activation of the autonomous driving mode, or remind an occupant on the vehicle that the vehicle is not adapted to activate the autonomous driving mode, namely, remind the occupant on the vehicle that activation of the autonomous driving mode might cause safety risks, and the occupant on the vehicle such as the driver decides whether to activate the autonomous driving mode.

Figure 3:
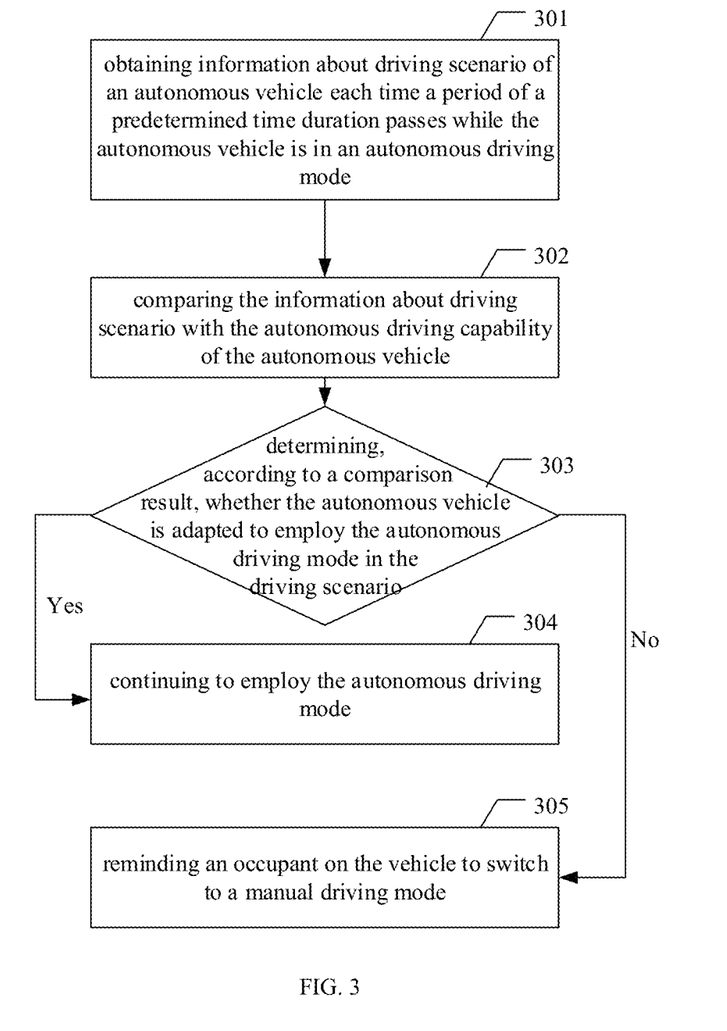
FIG. 3 is a flow chart of a method for autonomous driving determination according to a third embodiment of the present disclosure.

FIG. 3 is a flow chart of a method for autonomous driving determination according to a third embodiment of the present disclosure. As shown in FIG. 3, the method includes the following processes.

At 301, while the autonomous vehicle is in the autonomous driving mode, obtaining information about a driving scenario of the autonomous vehicle each time a period of a predetermined time duration passes.

In other words, while the autonomous vehicle travels in the autonomous driving mode, information about the driving scenario of the autonomous vehicle may be periodically obtained.

A specific value of the predetermined time duration may be determined according to actual needs.

The information about the driving scenario may include a location of the vehicle (such as latitude and longitude), weather, road conditions (such as a road type), traffic facilities (such as traffic lights), and the like. The information about the driving scenario may be obtained by a sensor, camera and the like deployed on the autonomous vehicle.

At 302, comparing the information about the driving scenario with the autonomous driving capability of the autonomous vehicle.

For example, comparison may be performed to find whether the information about the driving scenario includes content beyond a pre-stored range of autonomous driving capability.

At 303, determining, according to a comparison result, whether the autonomous vehicle is adapted to employ the autonomous driving mode in the driving scenario, and if yes, performing 304, otherwise performing 305.

If the information about the driving scenario includes content beyond the range of the autonomous driving capability, it may be determined that the autonomous vehicle is not adapted to employ the autonomous driving mode in the driving scenario.

If the information about the driving scenario does not include content beyond the range of the autonomous driving capability, it may be determined that the autonomous vehicle is adapted to employ the autonomous driving mode in the driving scenario.

The autonomous driving capability may be presented in a list or the like, which may include the type of a road on which the vehicle is allowed to travel, whether to allow driving in rainy or snowy weather, whether to allow driving on a road with traffic lights, a range of areas in which the vehicle is allowed to travel, and so on. The type of a road on which the vehicle is allowed to travel may refer to an urban road, a rural road or the like, and the range of areas in which the vehicle is allowed to travel may mean that the vehicle is allowed to travel only in certain specific areas or cities.

Assuming that the location of the vehicle in the obtained information about the driving scenario belongs to the city of Tangshan, whereas the city in which the vehicle is allowed by the autonomous driving capability to drive is Beijing, it may be believed that the information about the driving scenario includes content beyond the range of the autonomous driving capability, so that it is determined that the autonomous vehicle is not adapted to employ the autonomous driving mode in the driving scenario.

Assuming that the weather in the obtained information about the driving scenario is a rainy day, whereas the autonomous driving capability does not permit the vehicle to travel in rainy or snowy weather, it may be believed that the information about the driving scenario includes content beyond the range of the autonomous driving capability, so that it is determined that the autonomous vehicle is not adapted to employ the autonomous driving mode in the driving scenario.

Assuming that the road condition in the obtained information about the driving scenario is a rural road, whereas the type of a road on which the vehicle is allowed by the autonomous driving capability is an urban road, it may be believed that the information about the driving scenario includes content beyond the range of the autonomous driving capability, so that it is determined that the autonomous vehicle is not adapted to employ the autonomous driving mode in the driving scenario.

Assuming that the obtained information about the driving scenario shows that there are traffic lights on the road, whereas the autonomous driving capability does not permit the vehicle to travel on a road with the traffic lights, it may be believed that the information about the driving scenario includes content beyond the range of the autonomous driving capability, so that it is determined that the autonomous vehicle is not adapted to employ the autonomous driving mode in the driving scenario.

At 304, continuing to employ the autonomous driving mode.

If it is determined according to the comparison result that the autonomous vehicle is adapted to employ the autonomous driving mode in the driving scenario, the autonomous driving mode may be continued.

At 305, reminding an occupant on the vehicle to switch to a manual driving mode.

If it is determined according to the comparison result that the autonomous vehicle is not adapted to employ the autonomous driving mode in the driving scenario, the occupant on the vehicle is reminded to switch to the manual driving mode, in other words, the occupant on the vehicle is reminded that continued use of the autonomous driving mode might cause safety risks, and the occupant on the vehicle such as a driver decides whether to switch to the manual driving mode.

For example, while the autonomous vehicle travels in the autonomous driving mode, suddenly it rains heavily, and the road is wet and slippery and not adapted for continued autonomous driving, the driver may be reminded to switch to the manual driving mode to ensure the travel safety.

It is to be noted that, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to embodiments, and the involved actions and modules are not necessarily requisite for the present disclosure.

In the above description, embodiments are respectively described with respective focuses, and reference may be made to related depictions in other embodiments for portions not detailed in a certain embodiment.

In summary, according to the technical solutions of the method embodiments of the present disclosure, the matching degree between the autonomous driving capability of the autonomous vehicle and the current driving scenario may be checked and limited, thereby avoiding employing the autonomous driving mode in a scenario not suitable for autonomous driving mode, and thereby reducing a possibility of occurrence of an autonomous driving accident and improving safety of the vehicle and the user.

The above introduces embodiments for method. The technical solution of the present disclosure will be further described through an embodiment for an apparatus.

Figure 4:
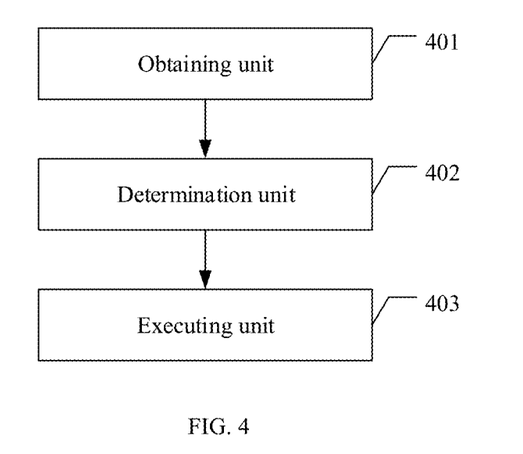
FIG. 4 is a structural schematic diagram of components of an apparatus for autonomous driving determination according to an embodiment of the present disclosure.

FIG. 4 is a structural schematic diagram of components of an apparatus for autonomous driving determination according to the present disclosure. As shown in FIG. 4, the apparatus includes an obtaining unit 401 and a determination unit 402.

The obtaining unit 401 is configured to obtain information about a driving scenario of an autonomous vehicle when a preset trigger condition is met.

The determination unit 402 is configured to compare the information about the driving scenario with an autonomous driving capability of the autonomous vehicle, and determine, according to a comparison result, whether the autonomous vehicle is adapted to employ an autonomous driving mode in the driving scenario.

The means described in this embodiment may be applied to various different scenarios, including but not limited to those shown in the following description.

For example, the obtaining unit 401 may obtain the information about the driving scenario of the autonomous vehicle when a request to activate the autonomous driving mode is received. Receiving a request to activate an autonomous driving mode may refer to receiving a request to switch from a manual driving mode to the autonomous driving mode, or receiving a request to directly activate the autonomous driving mode.

The information about the driving scenario may include a location of the vehicle (such as latitude and longitude), weather, road conditions (such as a road type), traffic facilities (such as traffic lights), and the like. The information about the driving scenario may be obtained by a sensor, camera and the like deployed on the autonomous vehicle. For example, the location of the vehicle may be obtained based on a positioning sensor, the weather may be obtained based on a humidity sensor, and the road conditions and traffic facilities may be obtained based on a camera, a millimeter wave radar and a laser radar.

The determination unit 402 may compare the information about the driving scenario with the autonomous driving capability of the autonomous vehicle. For example, comparison may be performed to find whether the information about the driving scenario includes content beyond a range of autonomous driving capability.

If the information about the driving scenario includes content beyond the range of the autonomous driving capability, it may be determined that the autonomous vehicle is not adapted to employ the autonomous driving mode in the driving scenario. If the information about the driving scenario does not include content beyond the range of the autonomous driving capability, it may be determined that the autonomous vehicle is adapted to employ the autonomous driving mode in the driving scenario.

The autonomous driving capability may be presented in a list or the like, which may include the type of a road on which the vehicle is allowed to travel, whether to allow driving in rainy or snowy weather, whether to allow driving on a road with traffic lights, a range of areas in which the vehicle is allowed to travel, and so on. The type of a road on which the vehicle is allowed to travel may refer to an urban road, a rural road or the like, and the range of areas in which the vehicle is allowed to travel may mean that the vehicle is allowed to travel only in certain specific areas or cities.

Assuming that the weather in the obtained information about the driving scenario is a rainy day, whereas the autonomous driving capability does not permit the vehicle to travel in rainy or snowy weather, it may be believed that the information about the driving scenario includes content beyond the range of the autonomous driving capability, so that it is determined that the autonomous vehicle is not adapted to employ the autonomous driving mode in the driving scenario.

The apparatus shown in FIG. 4 may further include: an executing unit 403 configured to activate the autonomous driving mode in response to determining according to the comparison result that the autonomous vehicle is adapted to employ the autonomous driving mode in the driving scenario, and prohibit activation of the autonomous driving mode, or remind an occupant on the vehicle that the vehicle is not adapted to activate the autonomous driving mode in response to determining according to the comparison result that the autonomous vehicle is not adapted to employ the autonomous driving mode in the driving scenario, namely, remind the occupant on the vehicle that activation of the autonomous driving mode might cause safety risks, and the occupant on the vehicle such as the driver decides whether to activate the autonomous driving mode.

For another example, the obtaining unit 401 may also obtain the information about the driving scenario of the autonomous vehicle each time a period of a predetermined time duration passes, while the autonomous vehicle is in the autonomous driving mode. In other words, while the autonomous vehicle travels in the autonomous driving mode, information about the driving scenario of the autonomous vehicle may be periodically obtained.

The determination unit 402 may compare the information about the driving scenario with the autonomous driving capability of the autonomous vehicle. For example, comparison may be performed to find whether the information about the driving scenario includes content beyond a range of autonomous driving capability.

If the information about the driving scenario includes content beyond the range of the autonomous driving capability, it may be determined that the autonomous vehicle is not adapted to employ the autonomous driving mode in the driving scenario. If the information about the driving scenario does not include content beyond the range of the autonomous driving capability, it may be determined that the autonomous vehicle is adapted to employ the autonomous driving mode in the driving scenario.

Correspondingly, when it is determined according to the comparison result that the autonomous vehicle is adapted to employ the autonomous driving mode in the driving scenario, the executing unit 403 may continue to employ the autonomous driving mode; when it is determined according to the comparison result that the autonomous vehicle is not adapted to employ the autonomous driving mode in the driving scenario, the executing unit 403 may remind the occupant on the vehicle to switch to the manual driving mode, that is, remind the occupant on the vehicle that continued use of the autonomous driving mode might cause safety risks, and the occupant on the vehicle such as a driver decides whether to switch to the manual driving mode.

Reference may be made to relevant depictions in the above embodiments for method for a specific workflow of the above apparatus embodiment shown in FIG. 4, which will not be detailed any more here.

To sum up, according to the technical solution of the embodiment for apparatus of the present disclosure, the matching degree between the autonomous driving capability of the autonomous vehicle and the current driving scenario may be checked and limited, thereby avoiding employing the autonomous driving mode in a scenario not suitable for autonomous driving mode, and thereby reducing a possibility of occurrence of an autonomous driving accident and improving safety of the vehicle and the user.

Figure 5:
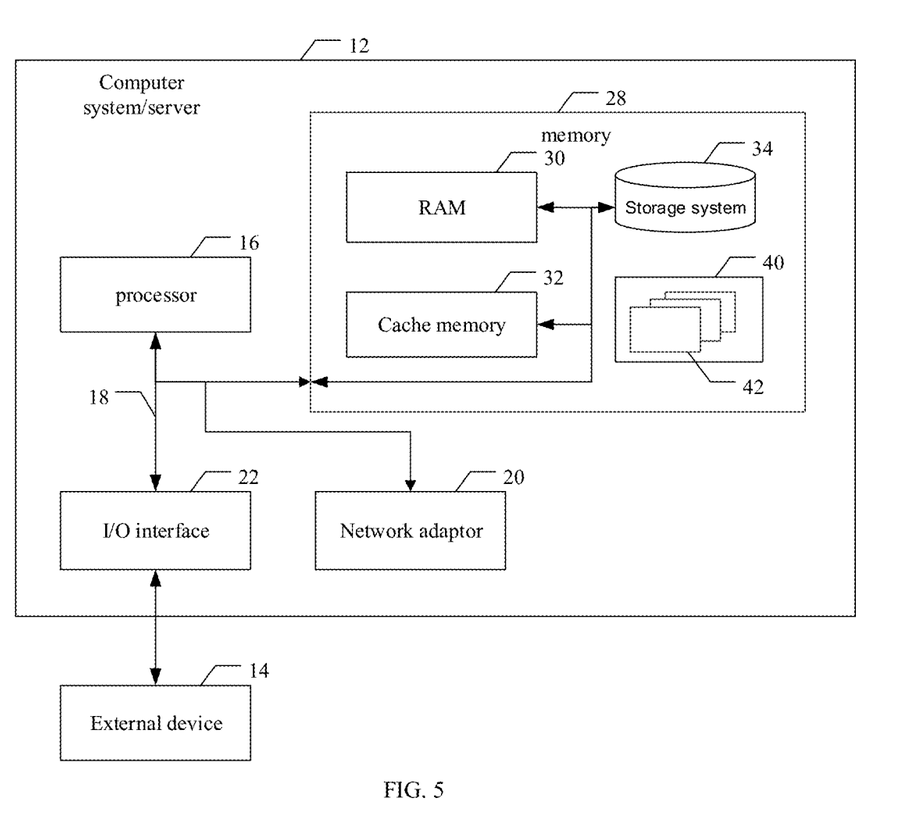
FIG. 5 illustrates a block diagram of an example computer system/server 12 adapted to implement one or more embodiments of the present disclosure.

FIG. 5 illustrates a block diagram of an example computer system/server 12 adapted to implement an implementation mode of the present disclosure. The computer system/server 12 shown in FIG. 5 is only an example and should not bring about any limitation to the function and scope of use of the embodiments of the present disclosure.

As shown in FIG. 5, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each drive may be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted in FIG. 5, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiment shown in FIG. 1, FIG. 2 or FIG. 3.

The present disclosure meanwhile provides a computer-readable storage medium on which a computer program is stored, the program, when executed by the processor, implementing the method stated in the embodiment shown in FIG. 1, FIG. 2 or FIG. 3.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium may be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method may be implemented in other ways. For example, the above-described embodiments for the apparatus are only exemplary, e.g., the division of the units is merely logical one, and, in reality, they may be divided in other ways upon implementation.

The units described as separate parts may be or may not be physically separated, the parts shown as units may be or may not be physical units, i.e., they may be located in one place, or distributed in a plurality of network units. One may select some or all the units to achieve the purpose of the embodiment according to the actual needs.

Further, in the embodiments of the present disclosure, functional units may be integrated in one processing unit, or they may be separate physical presences; or two or more units may be integrated in one unit. The integrated unit described above may be implemented in the form of hardware, or they may be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for autonomous driving determination, comprising:
  obtaining information about a driving scenario of an autonomous vehicle when a preset trigger condition is met;
  comparing the information about the driving scenario with an autonomous driving capability of the autonomous vehicle, to determine whether the information about the driving scenario includes content beyond a range of the autonomous driving capability;

determining, according to a comparison result, whether the autonomous vehicle is adapted to employ an autonomous driving mode in the driving scenario; and prohibiting activation of the autonomous driving mode, or reminding an occupant on the autonomous vehicle that the autonomous vehicle is not adapted to the autonomous driving mode, in response to determining that the information about the driving scenario includes content beyond the range of the autonomous driving capability.

2. The method according to claim 1, wherein the preset trigger condition is met when a request to activate the autonomous driving mode is received.

3. The method according to claim 2, further comprising:

activating the autonomous driving mode in response to determining according to the comparison result that the autonomous vehicle is adapted to employ the autonomous driving mode in the driving scenario; and prohibiting activation of the autonomous driving mode, or reminding an occupant on the autonomous vehicle that the autonomous vehicle is not adapted to activate the autonomous driving mode, in response to determining according to the comparison result that the autonomous vehicle is not adapted to employ the autonomous driving mode in the driving scenario.

4. The method according to claim 1, wherein the preset trigger condition is met each time a period of a predetermined time duration passes while the autonomous vehicle is in the autonomous driving mode.

5. The method according to claim 4, further comprising:

continuing to employ the autonomous driving mode in response to determining according to the comparison result that the autonomous vehicle is adapted to employ the autonomous driving mode in the driving scenario; and reminding an occupant on the autonomous vehicle to switch to a manual driving mode in response to determining according to the comparison result that the autonomous vehicle is not adapted to employ the autonomous driving mode in the driving scenario.

6. The method according to claim 1, wherein the comparing the information about the driving scenario with an autonomous driving capability of the autonomous vehicle comprises:

comparing to find whether the information about the driving scenario includes content beyond a range of the autonomous driving capability, and wherein the determining, according to a comparison result, whether the autonomous vehicle is adapted to employ an autonomous driving mode in the driving scenario comprises:

determining that the autonomous vehicle is not adapted to employ the autonomous driving mode in the driving scenario if the information about the driving scenario includes content beyond the range of the autonomous driving capability; and determining that the autonomous vehicle is adapted to employ the autonomous driving mode in the driving scenario if the information about the driving scenario does not include content beyond the range of the autonomous driving capability.

7. The method according to claim 1, wherein the autonomous driving capability comprises at least one of: a type of a road on which the autonomous vehicle is allowed to travel, whether to allow driving in rainy or snowy weather, whether to allow driving on a road with traffic lights, or a range of areas in which the autonomous vehicle is allowed to travel.

8. A computer device, comprising a memory, a processor and a computer program which is stored on the memory and runs on the processor, wherein the processor, upon executing the program, implements a method for autonomous driving determination, wherein the method comprises:

obtaining information about a driving scenario of an autonomous vehicle when a preset trigger condition is met;

comparing the information about the driving scenario with an autonomous driving capability of the autonomous vehicle, to determine whether the information about the driving scenario includes content beyond a range of the autonomous driving capability;

determining, according to a comparison result, whether the autonomous vehicle is adapted to employ an autonomous driving mode in the driving scenario; and prohibiting activation of the autonomous driving mode, or reminding an occupant on the autonomous vehicle that the autonomous vehicle is not adapted to the autonomous driving mode, in response to determining that the information about the driving scenario includes content beyond the range of the autonomous driving capability.

9. The computer device according to claim 8, wherein the preset trigger condition is met when a request to activate the autonomous driving mode is received.

10. The computer device according to claim 9, wherein the method further comprising:

activating the autonomous driving mode in response to determining according to the comparison result that the autonomous vehicle is adapted to employ the autonomous driving mode in the driving scenario; and prohibiting activation of the autonomous driving mode, or reminding an occupant on the autonomous vehicle that the autonomous vehicle is not adapted to activate the autonomous driving mode, in response to determining according to the comparison result that the autonomous vehicle is not adapted to employ the autonomous driving mode in the driving scenario.

11. The computer device according to claim 8, wherein the preset trigger condition is met each time a period of a predetermined time duration passes while the autonomous vehicle is in the autonomous driving mode.

12. The computer device according to claim 11, wherein the method further comprising:

continuing to employ the autonomous driving mode in response to determining according to the comparison result that the autonomous vehicle is adapted to employ the autonomous driving mode in the driving scenario; and reminding an occupant on the autonomous vehicle to switch to a manual driving mode in response to determining according to the comparison result that the autonomous vehicle is not adapted to employ the autonomous driving mode in the driving scenario.

13. The computer device according to claim 8, wherein the comparing the information about the driving scenario with an autonomous driving capability of the autonomous vehicle comprises:

comparing to find whether the information about the driving scenario includes content beyond a range of the autonomous driving capability, and wherein the determining, according to a comparison result, whether the autonomous vehicle is adapted to employ an autonomous driving mode in the driving scenario comprises:

determining that the autonomous vehicle is not adapted to employ the autonomous driving mode in the driving scenario if the information about the driving scenario includes content beyond the range of the autonomous driving capability; and determining that the autonomous vehicle is adapted to employ the autonomous driving mode in the driving scenario if the information about the driving scenario does not include content beyond the range of the autonomous driving capability.

14. The computer device according to claim 8, wherein the autonomous driving capability comprises at least one of: a type of a road on which the autonomous vehicle is allowed to travel, whether to allow driving in rainy or snowy weather, whether to allow driving on a road with traffic lights, or a range of areas in which the autonomous vehicle is allowed to travel.

15. A non-transitory computer-readable storage medium on which a computer program is stored, wherein the program, when executed by a processor, implements a method for autonomous driving determination, wherein the method comprises:

obtaining information about a driving scenario of an autonomous vehicle when a preset trigger condition is met;

comparing the information about the driving scenario with an autonomous driving capability of the autonomous vehicle, to determine whether the information about the driving scenario includes content beyond a range of the autonomous driving capability; and determining, according to a comparison result, whether the autonomous vehicle is adapted to employ an autonomous driving mode in the driving scenario; and prohibiting activation of the autonomous driving mode, or reminding an occupant on the autonomous vehicle that the autonomous vehicle is not adapted to the autonomous driving mode, in response to determining that the information about the driving scenario includes content beyond the range of the autonomous driving capability.

16. The non-transitory computer-readable storage medium according to claim 15, wherein the preset trigger condition is met when a request to activate the autonomous driving mode is received.

17. The non-transitory computer-readable storage medium according to claim 16, wherein the method further comprising:

activating the autonomous driving mode in response to determining according to the comparison result that the autonomous vehicle is adapted to employ the autonomous driving mode in the driving scenario; and prohibiting activation of the autonomous driving mode, or reminding an occupant on the autonomous vehicle that the autonomous vehicle is not adapted to activate the autonomous driving mode, in response to determining according to the comparison result that the autonomous vehicle is not adapted to employ the autonomous driving mode in the driving scenario.

18. The non-transitory computer-readable storage medium according to claim 15, wherein the preset trigger condition is met each time a period of a predetermined time duration passes while the autonomous vehicle is in the autonomous driving mode.

19. The non-transitory computer-readable storage medium according to claim 18, wherein the method further comprising:

continuing to employ the autonomous driving mode in response to determining according to the comparison result that the autonomous vehicle is adapted to employ the autonomous driving mode in the driving scenario; and reminding an occupant on the autonomous vehicle to switch to a manual driving mode in response to determining according to the comparison result that the autonomous vehicle is not adapted to employ the autonomous driving mode in the driving scenario.

20. The non-transitory computer-readable storage medium according to claim 15, wherein the comparing the information about the driving scenario with an autonomous driving capability of the autonomous vehicle comprises:

comparing to find whether the information about the driving scenario includes content beyond a range of the autonomous driving capability, and wherein the determining, according to a comparison result, whether the autonomous vehicle is adapted to employ an autonomous driving mode in the driving scenario comprises:

determining that the autonomous vehicle is not adapted to employ the autonomous driving mode in the driving scenario if the information about the driving scenario includes content beyond the range of the autonomous driving capability; and determining that the autonomous vehicle is adapted to employ the autonomous driving mode in the driving scenario if the information about the driving scenario does not include content beyond the range of the autonomous driving capability.

\* \* \* \* \*